Aug. 12, 1930.  L. M. CURRIE  1,772,457
SEALING COMPOSITION
Filed May 10, 1927
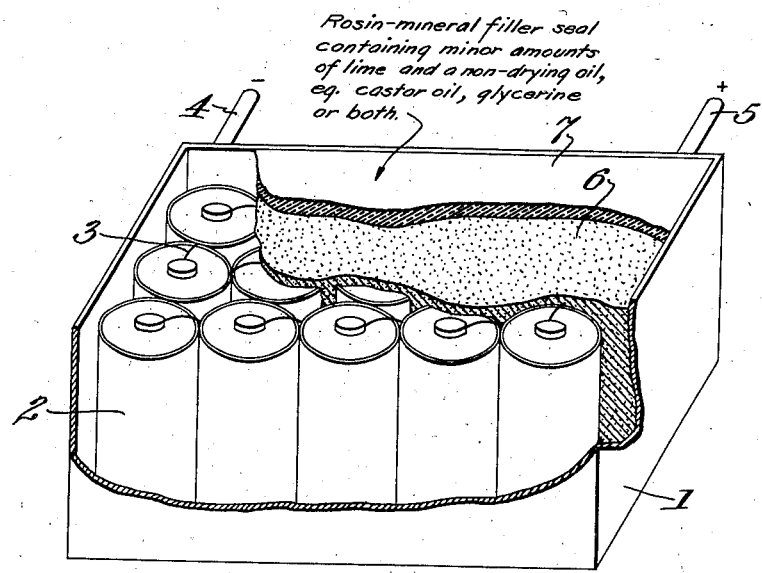
Inventor:
Lauchlin M. Currie
By Byrnes Townsend & Brickenstein,
Attorneys Patented Aug. 12, 1930

1,772,457

UNITED STATES PATENT OFFICE

LAUCHLIN M. CURRIE, OF LAKEWOOD, OHIO, ASSIGNOR TO NATIONAL CARBON CO., INC., A CORPORATION OF NEW YORK

SEALING COMPOSITION

Application filed May 10, 1927. Serial No. 190,280.

This invention relates to improvements in thermoplastic compositions for use in sealing dry cells and dry cell batteries. A composition which has been rather generally used to seal dry cells and dry cell batteries is a mixture of rosin and a mineral filler. Usually small amounts of lime, for strengthening purposes, and coloring matter are also present. Seals of this composition show a pronounced tendency to crack when subjected to sudden and extreme temperature changes. Such cracking is accentuated when lime is present and particularly when such seals are poured upon an asphaltic sub-seal base, as is the practice with some battery manufacturers.

The present invention has for an object the production of a seal which is characterized by toughness and ability to withstand wide and sudden temperature changes without cracking, even under the special conditions above mentioned. Another object of the invention is to provide a sealing composition having greater fluidity at a given temperature, thus permitting the pouring operation to be more easily controlled or to be carried on at a lower temperature. A further object of the invention is to provide a sealing material which wets the brass terminals and other metallic portions of the cell with which it comes into contact and adheres more readily and firmly thereto than has been the case with the sealing compositions heretofore used. Other objects and advantages of the invention will appear from the appended description and drawing.

The figure of drawing is a perspective view of a battery partly broken away.

According to the present invention small percentages of a non-drying oil or a polyhydric alcohol or both, and with or without certain additional materials hereinafter to be described, are added to the rosin-mineral filler composition. Either vegetable or mineral non-drying oils may be used, although the former are preferred. A vegetable oil which has been found especially suitable for the purposes of the present invention is castor oil. Other non-drying vegetable oils which can be used with satisfactory results are olive oil, peanut oil and palm oil. Examples of mineral oils which may be used are paraffin oils such as straw paraffin oil. Of the polyhydric alcohols, glycerine has been found to be most suitable for the purposes of this invention although others may be used.

The amounts of addition materials which are required to effect the desired improvements vary somewhat with the proportions of rosin and mineral filler used, and particularly with respect to the amount of lime used for strengthening purposes. In general the amount of oil or glycerine addition should not exceed about 3% by weight of the seal composition, and preferably is varied in direct proportion to the amount of lime present in the composition.

For a rosin-mineral filler seal composition containing a relatively high-lime content, namely 1%, and with the proportions of rosin and mineral filler so controlled as to give a seal which is characterized by high strength and ability to resist bulging or rupture,—aside from its tendency to crack because of temperature changes,—when subjected to stresses such as are due to the internal pressure created by gases generated within the dry cells of the battery, castor oil additions ranging from 1% to 2.25% have been found to give highly satisfactory results. Good results may also be obtained by substituting glycerine in part or wholly for castor oil.

The following comparative results indicate the improvement which has been obtained by the use of additions of the class described:

*Example No. 1*

One lot of batteries sealed with a composition containing approximately 50% rosin, 36% sand, 10% fibrous asbestos, and 1% lime, with the balance coloring matter, was placed in cold storage at 0° C., and observed for cracking of the seal. After three days, 21% of the batteries showed cracks in the seal and after eight days, the seal of 25% of the batteries had cracked.

Another lot of batteries similar in every respect except that 1.5% of castor oil was added to the seal composition, was subjected to identical cold storage conditions and showed no cracking of the seal at the end of fourteen days in cold storage.

The castor oil-treated seal also showed improvements in other respects and particularly as to pouring properties, freedom from pits and air bubbles. The untreated seal was poured with some difficulty and was characterized by the presence of bubbles, with 24% of the batteries requiring retorching, whereas the castor oil-treated seal poured evenly and well at a somewhat lower temperature and formed a smooth surface with only 8% requiring retorching.

Example No. 2

Two lots of batteries sealed with approximately the same rosin-mineral filler composition as specified in Example No. 1, except that the lime content was only approximately 0.5%, and the castor oil content of the treated lot was 0.5%, when subjected to cold storage conditions, showed similar improvement in favor of the oil-treated seal. Of the lot containing untreated seal, the seal on 3% cracked in seven days, and 12.5% in fourteen days. None of the lot using castor oil-treated seal showed cracks at the end of fourteen days in cold storage. Better finish of the seal and control of the pouring operation was obtained with the treated seal.

Example No. 3

Another lot of batteries sealed with a rosin-mineral filler composition containing approximately 0.5% of lime and to which had been added 1.1% anhydrous zinc sulphate and 0.5% glycerine, was placed in cold storage for ten days and compared with a lot sealed with a material similar in composition except that it contained no zinc sulphate-glycerine addition. At the end of ten days 17.5% of the untreated lot showed cracks as compared with 4% of the treated seals.

When zinc sulphate is used in addition to oil or glycerine the amount of sulphate added preferably should be about equal in molecular proportions to the lime content of the seal composition. Other addition materials which may be added in conjunction with glycerine or a non-drying oil are various metallic soaps such as lead tungate, lead linoleate or lead resinate. These materials, as well as zinc sulphate, serve to strengthen the seal and are preferably introduced with the glycerine or other oil addition when the rosin-mineral filler composition used is one which would otherwise be characterized by relatively low strength. For such relatively low strength seal compositions containing up to approximately 0.5% lime, molecular proportions of anhydrous zinc sulphate or equivalent strengthening addition, and from 0.25% to 1.10% glycerine and/or non-drying oil are sufficient to improve the non-cracking properties of the seal to the desired extent and also to impart requisite strength. In addition to the above mentioned improved properties which are possessed by treated seals as compared with untreated seal compositions, it is to be noted that the molten treated seal much more readily wets the brass terminals and other metallic portions of the cells with which it comes in contact than does the untreated seal composition, thus insuring more perfect sealing at these surfaces of contact.

Referring to the drawing, numeral 1 denotes a battery box or casing which may be made of cardboard, wood or other suitable material. Cells 2 are arranged in the casing and are preferably compactly assembled in three rows of five cells each. Connectors 3 join the cells in series and external terminals 4 and 5 are provided.

When the cells are properly assembled in the casing, an insulating asphaltic sealing compound is made fluid by heating and is poured about the cells, preferably in quantity sufficient to completely embed them and to extend over their tops to form a layer of substantial thickness thereon, as indicated at 6. After the asphaltic sub-seal 6 is solidified a finish layer 7 of sealing material composition of the kind more specifically described above is poured over the sub-seal to fill the casing substantially to the top.

The invention is shown in the drawing as applied to a conventional form of battery used in radio communication. It is to be understood, however, that it is not limited in application to this type of battery and may be applied in sealing other types of batteries as well as single cells.

It is also to be understood that various modifications may be made in the proportions and kinds of materials used in forming the rosin-mineral filler composition which forms the base for my new composition. For example, while rosin has been specified above, it will be understood that equivalent natural and artificial resins may be substituted. Also, various other materials than those indicated may comprise the mineral filler component.

What I claim is:

1. A battery seal composition consisting principally of rosin and a mineral filler and including minor proportions of a non-drying vegetable oil and lime.

2. A battery seal composition consisting principally of rosin and a mineral filler and containing minor proportions of castor oil and lime.

3. A battery seal composition consisting principally of rosin and a mineral filler, and containing minor proportions of a non-drying vegetable oil, glycerine, and lime.

4. A battery seal composition containing principally rosin and a mineral filler, up to 1% of lime, and up to 3% of a non-drying vegetable oil.

5. A battery seal composition containing approximately .5% to 1% lime, from about .25% to 3% of at least one of the following non-drying substances: a polyhydric alcohol, a non-drying oil; and the remainder principally rosin and mineral filler.

6. A battery seal composition containing approximately .5% to 1% lime, from .25% to 3% of at least one of the following non-drying substances: glycerine, a vegetable non-drying oil; and the remainder principally rosin.

7. A battery seal composition containing approximately .5% to 1% lime, from .25% to 3% of at least one of the following non-drying substances: glycerine, castor oil; and the remainder principally rosin.

8. A battery seal composition containing approximately 95% of rosin and mineral filler, up to about 1% lime, and up to about 3% of a polyhydric alcohol, with the balance principally coloring matter.

9. A battery seal composition consisting principally of rosin and a mineral filler, and including minor proportions of a polyhydric alcohol, lime and anhydrous zinc sulphate.

10. A battery seal composition containing principally rosin and a mineral filler, up to 0.5% lime, up to 1.1% anhydrous zinc sulphate, and up to 1.1% glycerine.

In testimony whereof, I affix my signature.

LAUCHLIN M. CURRIE.